(12) United States Patent
Chang et al.

(10) Patent No.: US 7,260,728 B2
(45) Date of Patent: Aug. 21, 2007

(54) WINDOWS-BASED POWER MANAGEMENT METHOD AND RELATED PORTABLE DEVICE

(75) Inventors: Ruei-Chuan Chang, Taipei Hsien (TW); De-Jen Lu, Taipei Hsien (TW)

(73) Assignee: Acer Incorporated, Taipei (TW)

( * ) Notice: Subject to any disclaimer, the term of this patent is extended or adjusted under 35 U.S.C. 154(b) by 310 days.

(21) Appl. No.: 10/711,356

(22) Filed: Sep. 13, 2004

(65) Prior Publication Data

US 2005/0125700 A1    Jun. 9, 2005

(51) Int. Cl.
*G06F 1/00* (2006.01)
(52) U.S. Cl. ..................... 713/300; 713/310
(58) Field of Classification Search ............. 713/300, 713/310
See application file for complete search history.

(56) References Cited

U.S. PATENT DOCUMENTS

| 5,532,935 | A | * | 7/1996 | Ninomiya et al. | 700/296 |
| 5,630,148 | A | * | 5/1997 | Norris | 713/322 |
| 6,115,823 | A | * | 9/2000 | Velasco et al. | 713/322 |
| 6,834,354 | B1 | * | 12/2004 | Togawa | 713/320 |
| 2003/0191976 | A1 | * | 10/2003 | Cyran et al. | 713/340 |
| 2004/0044914 | A1 | * | 3/2004 | Gedeon | 713/300 |
| 2004/0073822 | A1 | * | 4/2004 | Greco et al. | 713/300 |
| 2005/0125701 | A1 | * | 6/2005 | Hensbergen et al. | 713/320 |
| 2006/0005057 | A1 | * | 1/2006 | Nalawadi et al. | 713/320 |

* cited by examiner

*Primary Examiner*—Chun Cao
*Assistant Examiner*—Ji H Bae
(74) *Attorney, Agent, or Firm*—Winston Hsu

(57) ABSTRACT

Disclosed is a windows-based power management method for optimally distributing power for various tasks in a portable device. The power management method includes the following steps: (a) categorizing each task to be executed by the portable device, (b) prescribing a power management policy, (c) distributing shares of a power supply unit among the tasks based on the category the tasks are associated therewith according to the power management policy, and (d) in response to the commands input by the user through a graphical user interface, increasing the share of the power supply unit provided for a task running within an active window of the portable device to accomplish an optimized distribution of power among tasks to be executed by the portable device.

22 Claims, 3 Drawing Sheets

WINDOWS-BASED POWER MANAGEMENT METHOD AND RELATED PORTABLE DEVICE

BACKGROUND OF INVENTION

1. Field of the Invention

The present invention relates to a windows-based power management method, and more particularly to a windows-based power management method for optimizing the power distribution in a portable device.

2. Description of the Prior Art

The typical power source of a notebook computer is a battery when the notebook computer is not connected to an external power outlet. The obvious drawback of using a battery as the power source for a notebook computer is that a battery can only provide a limited amount of power. Because of the limited amount of power of a battery, the usage time of a battery-powered notebook computer is variable, depending on the power consumption of the electronic devices used in the notebook computer.

Generally, one of the most straightforward and simplest ways to extend the usage time of a battery-powered notebook computer is to substitute the electronic device or component used in the notebook with an alternative that consumes less power while providing the same function. For example, most notebook computers employ a TFT (thin film transistor) LCD as their display screens, which dissipate more than 70% of the power supplied by the battery. However, the usage time of a battery-powered notebook computer can be extended obviously by using an organic EL display (organic electroluminescent display) instead of a TFT (thin film transistor) LCD.

Another approach to extend the usage time of a battery-powered notebook computer can be attained by using a central processing unit (CPU) chip with a low threshold voltage and thin oxide gates. In this case, the usage time of a battery-powered notebook computer can be prolonged by making a trade-off with the performance of the CPU. Another approach to extend the usage time of a battery-powered notebook computer is to use a non-volatile memory such as a flash memory instead of a hard disk. Non-volatile memory consumes less power because it does not consume a considerable amount of power as a hard disk when it is starting or stopping operation.

Though the above-mentioned way is very simple, its implementation is not always practical. Generally the main reason is due to the fact that the technology being essential to these alternatives is still under development or these alternatives are not so cost-effective as to replace the widely used electronic device. Taking the organic EL display for example, there are still many technical problems that are needed to overcome. As for the flash memory, the consideration on cost prevents it from replacing the hard disk because it is much more expensive to adopt a flash memory in place of a hard disk. As a result, designers of portable electrical devices have to employ other solutions to solve the problem of how to extend the usage time of a battery-powered notebook computer.

Another approach to extend the usage time of a battery-powered notebook computer is to use electronic devices with low power consumption. For instance, the most common example is to power off the hard disk of a notebook when it is not accessing data. Another example is to direct the processor of notebook to operate in a lower voltage. Power is saved in this way because the power consumption in a clock cycle is proportional to the square of the operation voltage. As a result, the power consumption of the processor is reduced efficiently by adjusting the operating voltage of processor dynamically, thereby extending the usage time of the notebook computer without needing extra time slots of the processor.

In addition to the solution by using electronic devices with low power consumption, another way for reducing the power consumption is to utilize a time-sharing system that schedules power management. In other words, under a time-sharing system the operating system takes the demands of each program into consideration and allocates different amounts of power to the processor when it runs different programs. When a first-come first-served (FCFS), shortest job first (SJF), priority scheduling, round-robin scheduling, multilevel queue scheduling, or multilevel feedback queue scheduling is used, the allocated CPU time slots for the programs that are sorted into the same category are fixed (note, however, deterministic modeling or scheduling evaluation of a queuing model applies a different standard for scheduling based on the characteristic of CPU, for example, the utilization of CPU, the throughput of CPU, and the waiting time of CPU). For example, most application programs can be divided into the following categories: soft real-time application programs such as a video player program or a music player program, interactive application programs such as a web browser, and batch application programs such as FTP (file transfer protocol) client software. According to the execution cycle of a program, the operating system allocates different time slices for CPU to execute different tasks in order to save power while avoiding a noticeable reduction in efficiency. When a program is being executed, the operating system also provides a plurality of time slices for CPU to execute different programs.

The typical power management method of portable devices, such as a battery-powered notebook computer, provides the processor with time slices to programs according to time that program needs to be accomplished. However, this kind of power management method does not involve adjusting the power supply requirements with time. This can pose a problem when users execute several tasks on a portable device. Typically, the task which is of a major concern to the user and which has to be accomplished as quickly as possible is the task running in an active window. It would improve efficiency if the resources can be transferred from low priority tasks, which are not to be executed momentarily by processor, to the task running in active window. The present invention can satisfy these needs.

SUMMARY OF INVENTION

It is therefore the primary objective of the claimed invention to provide different ratios of a power supply for different tasks to be executed on a portable device, so as to solve the mentioned problem.

According to the claimed invention, a method of power management on a portable device is disclosed. This method comprises: (a) categorizing each task to be executed on the portable device; (b) prescribing a power management policy; (c) according to the policy, allocating each task with a predetermined ratio of a unit power supply based on the category of which the task is associated therewith; and (d) increasing the ratio of the unit power supply allocated to a task running in an active window according to the commands entered through a graphical user interface.

Also what is claimed by the present invention is a portable device comprising a processor for executing multiple tasks, and a power management device for categorizing each task to be executed on the portable device, prescribing a power management policy, allocating a predetermined ratio of a unit power supply to each task accordingly, and increasing the ratio of the unit power supply allocated to a task running in active window in response to the commands input by user.

These and other objectives of present invention will no doubt become obvious to those of ordinary skill in the art after reading the following detailed description of the preferred embodiment, which is illustrated in the various figures and drawings.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
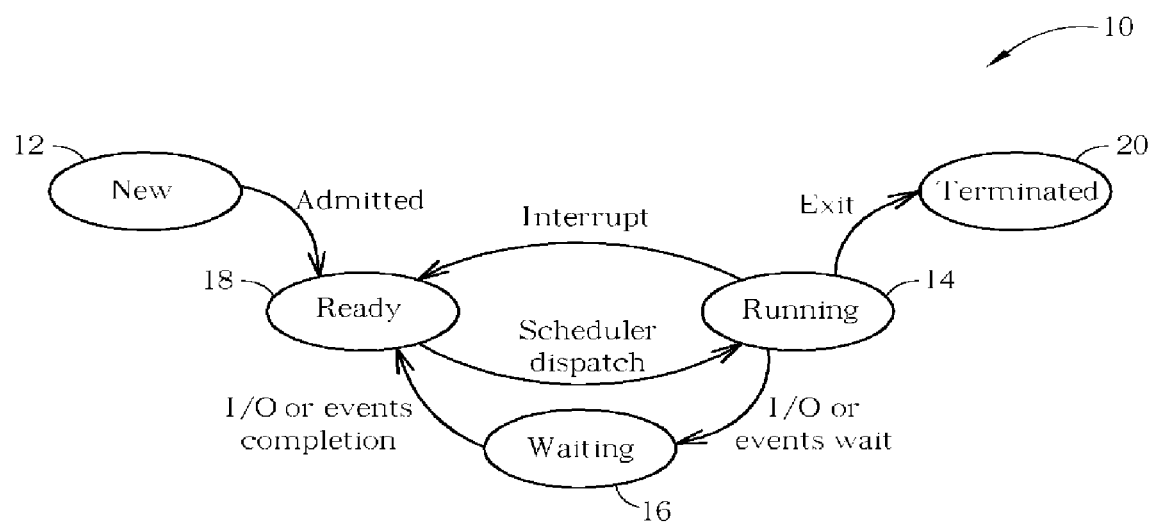
FIG. 1 is a state diagram showing the process scheduling in a windows-based operating system running on processor accomplishing jobs in a portable device.

Please refer to FIG. 1, which is a state diagram showing the process scheduling in a windows-based operating system running on a portable device 60. The process state 10 comprises a new state 12 when a task is newly created, a running state 14 where the instructions contained in the task is under execution (meaning that the task takes up the resource of the processor), a waiting state 16 which is a state that the execution of the task is pending to wait for the occurrence of particular events, such as the completion of I/O transfer, a ready state 18 which is a state that the task is ready for execution, and a terminated state 20 which is a state that the execution of the task is terminated.

Assume a task P, when it is created, is in the new state 12; the task P then enters the ready state 18 immediately. However, only one of the tasks in ready state 18 will be assigned or dispatched to enter the running state 14 by the scheduler and then executed by processor. The execution of a task in the running state 14, though, might be interrupted and forced to return back to the waiting state 16 by the processor because of an I/O request or waiting events. It is also possible that a task in the running state is forced to enter the waiting state 16 temporarily until the I/O request or waiting events is finished and then returned to a ready state 18.

In other words, the task P is first put in a task queue, which records the tasks to be executed by the portable device. When the portable device is ready to execute the task P, the task P is moved to a ready queue, as the portable device can only execute tasks that are put in the ready queue. Each task has a corresponding process control block (PCB) for recording scheduling control information (new, ready, waiting, running, and terminated state), the content of the registers of CPU, scheduling data, the information of I/O state, etc. When the task P in a running state is interrupted or called by the system, the operating system makes a context switch and replaces the corresponding process control block of the task P with a process control block of the task that is presently in process.

Figure 2:
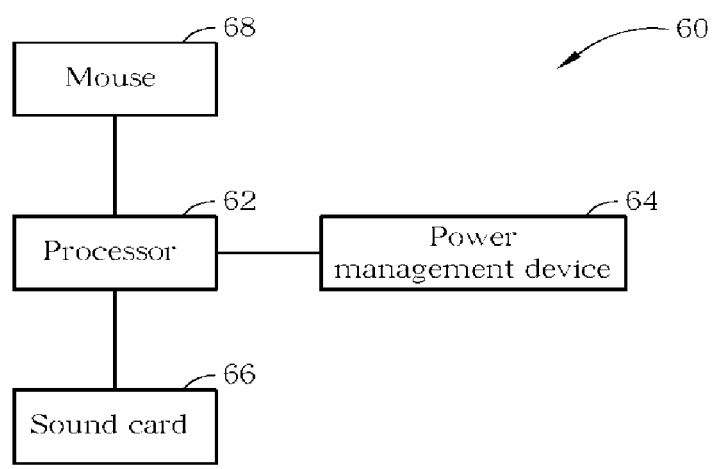
FIG. 2 is a functional block diagram of a preferred embodiment of a portable device of present invention.

Please refer to FIG. 2. As mentioned above, a typical method of power management of a portable device allocates power supply to the processor with different time slices based on different kinds of tasks, which are executed by the processor. Generally speaking, there is no imminent urgency for executing batch application programs. In other words, batch application programs can be executed, after the processor 62 of the portable device 60 finishes the execution for all the other applications (soft real-time application programs and interactive application programs). Therefore, the power management method according to the present invention only allocates a small ratio of power supply for the processor 62 to execute batch application programs. However, soft real-time application programs and interactive application programs, whose execution speed is a concern of users, are allocated with a larger ratio of the power supply (meaning more CPU time slices) at the expense of delaying the execution of the batch application programs.

Please refer to FIG. 2, which is a functional block diagram of the preferred embodiment of a portable device 60 of the present invention. The portable device 60 comprises a processor 62, a power management device 64, a sound card 66, and an input device 68, such as a mouse. In this preferred embodiment of the present invention, the power management device 64 is implemented by software. The main function of the power management device 64 is to optimize the power distribution between the tasks to be executed on the portable device 60 and allow users to dynamically adjust the power consumption of a task running in the active window of a portable device 60. The operation of the power management device 64 is shown below.

Figure 3:
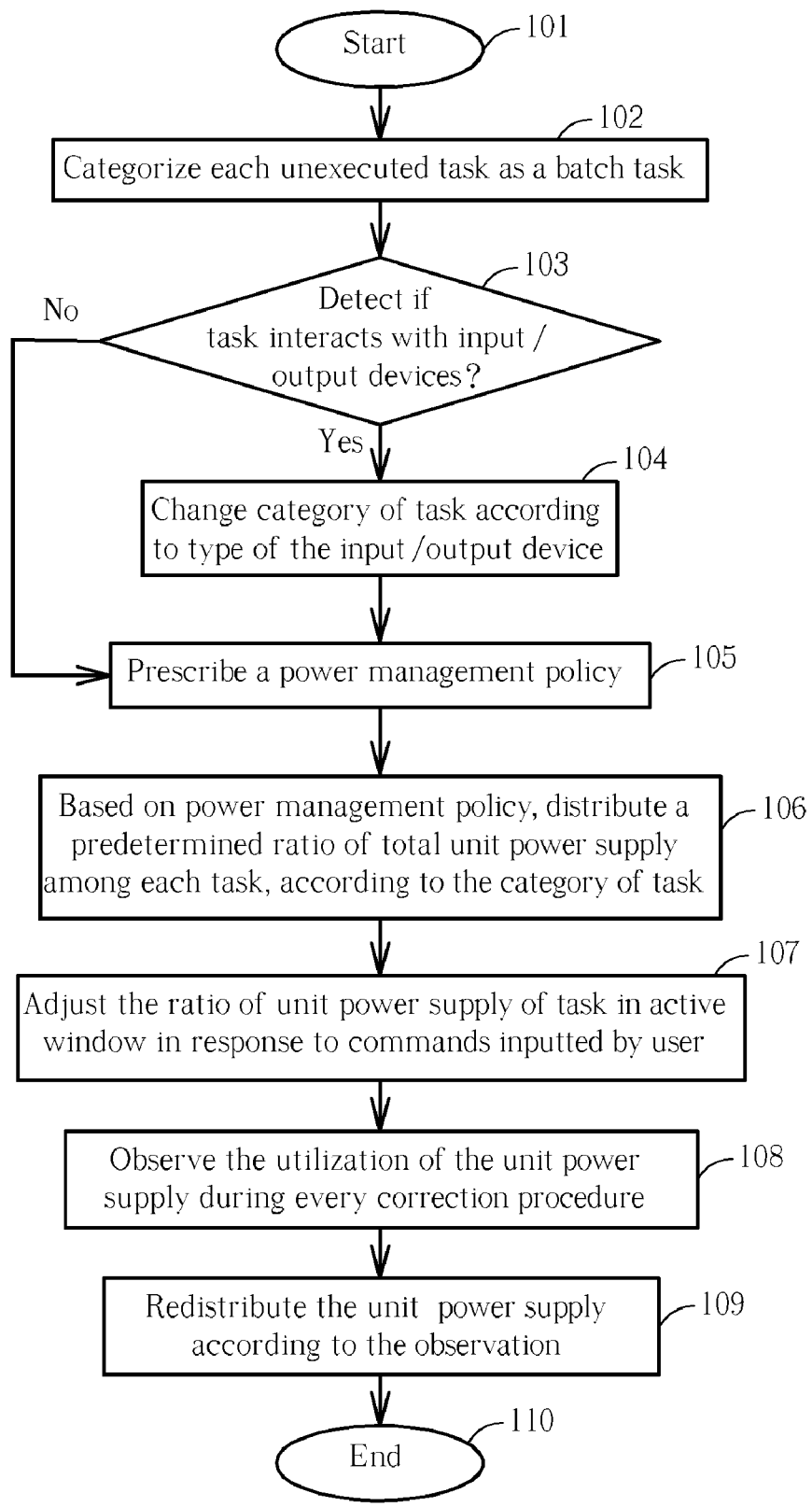
FIG. 3 is an operating flow chart of a preferred embodiment of a power management device.

Please refer to FIG. 3, which is a flow chart of the operating method 100 of a preferred embodiment according to the present invention. The method 100 comprises:

Step 101: Start.

Step 102: The power management device 64 categorizes each task, and each task to be executed on the portable device is categorized as a batch task in the beginning.

Step 103: Power management device 64 changes the category of the task according to the input/output device of which the task interacts therewith. For instance, a music player or video player interacts with the sound card to play music or video; therefore, the corresponding tasks are designated as soft real-time tasks when the sound card operates. A web browser program interacts with a user through a mouse. When a user enters commands from mouse, the corresponding task is grouped as an interactive task. Other programs like the FTP file download program that has the characteristic of executing a batch of jobs are grouped into batch tasks because it accomplishes all jobs automatically after the user schedules a batch job. If all tasks do not interact with any kind of input/output device, jump to step 105, otherwise go to step 104.

Step 104: Mark each task, according to the decision made in step 103.

Step 105: Prescribe a power management policy. The power management device 64 prescribes a power management policy after the tasks to be executed on the portable device are categorized, and deciding the ratios of the unit power supply to be allocated to each task. The step of prescribing a power management policy by the power management device 64 comprises: designating a total usage time of the portable device as desired by a user, setting a periodic interval for carrying out a correction procedure, and estimating the total power supply amount provided by the portable device.

For example, assume the total power supply amount of a portable device is 1500 W and the desired usage time of the portable device is about 120 minutes. In this example, the power management device 64 defines the duration of one minute as a power supply cycle, and calculates the total power supply amount and the unit power supply in a single power supply cycle for the processor. As a result, the power management device 64 estimates that the unit power supply is 12.5 W (unit power supply=total power supply amount/the number of power supply cycles within the desired usage time: 1500/120=12.5 W). Then the power management device 64 distributes a predetermined ratio (percentage) of the unit power supply to each task, according to the required amount of power for each task.

Take the following situation for instance. Soft real-time tasks have to play music and video in real-time, meaning that any kind of jitter or noise interference should be avoided. As a result, it needs a larger ratio of the unit power supply, which in this example is 60% of the unit power supply for the processor according to the present invention. Interactive tasks need a smaller ratio of the unit power supply than the soft real-time task and are distributed 30% of the unit power supply for the processor. Batch tasks, which are executed by the processor after a user enters a scheduled job, need a very small share of the unit power supply. In this case, the power management device 64 distributes 5% of the unit power supply for the processor to execute batch tasks according to the present invention. Furthermore, the active window, which is of the most concern, is distributed 5% of the unit power supply for the processor according to the present invention. The steps of executing the correction procedure will be introduced later.

Step 106: The power management device 64 distributes a predetermined ratio of the unit power supply among the tasks, according to the category of the tasks and the power management policy. Continuing with the example situation given in Step 105, the ratio of the power supply for soft real-time tasks is 60% of the unit power supply. Assume two soft real-time tasks are executed in the portable device, and therefore the distributed share of unit power supply for each soft real-time task is 12.5×0.6×=3.75 W. Assume five interactive tasks are executed on the portable device. Since the interactive tasks are provided 30% of the unit power supply, the distributed share of unit power supply for each task is 12.5×0.3×=0.75 W. Assume two batch tasks are executed in the portable device. Batch tasks are provided 5% of the unit power supply amount, resulting in a distributed share of unit power supply for each task being 12.5×0.05×=0.3125 W. Finally, there is only one active window in the portable device. Since the active window is provided with 5% of the unit power supply, the distributed share of unit power supply for the task running in the active window is 12.5×0.05×1 =0.625 W. Every task accomplishes its job with the distributed share of unit power supply.

Figure 4:
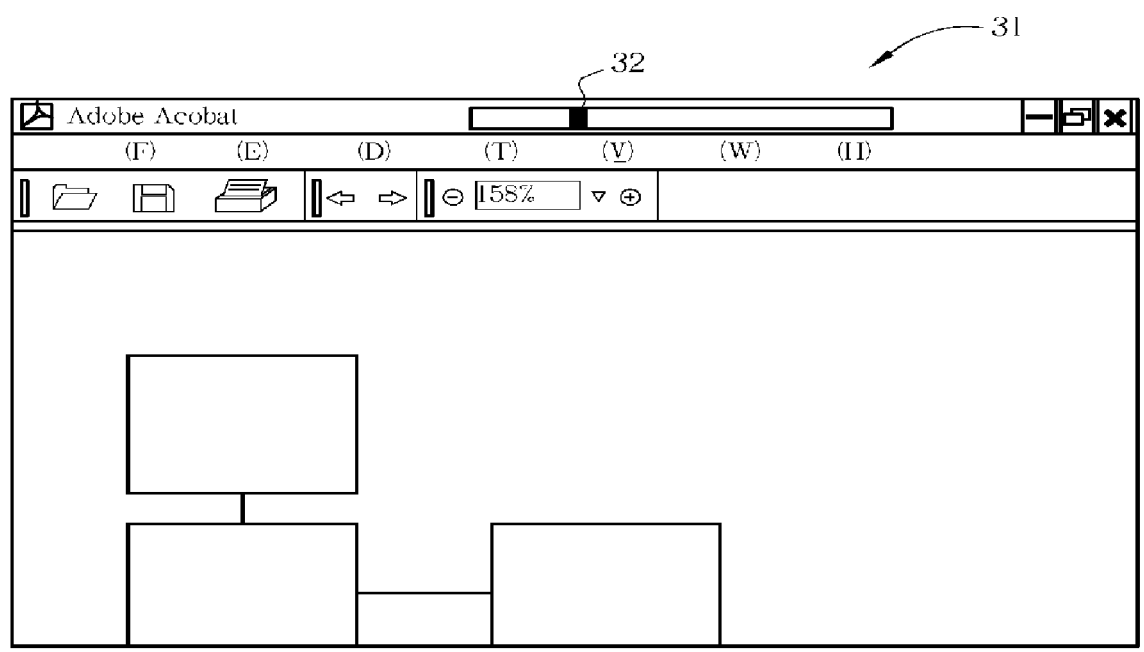
FIG. 4 is a schematic diagram of a preferred embodiment of a power management device for manually adjusting the ratio of a unit power supply allocated to the task running in active window through a graphical user interface.

Step 107: Adjust the ratio of the unit power supply of the task running in the active windows according to commands entered by the user. The power management device 64 provides a graphical user interface, which allows the user to adjust the ratio of the unit power supply of the task running in an active window according to the present invention. Please refer to FIG. 4. The top of the active window in FIG. 4 is provided with a slide bar 32. In most cases, the user of a portable device would rather pay more attention to the job running in the active widow 31. With the present invention, users can distribute more share of unit power supply to the task running in the active window 31, which can be accomplished by moving the bar of the slide bar 32 with a mouse to increase the ratio of the unit power supply for the task running in active window 31. Note as the ratio of the unit power supply of the task running in the active window 31 is increased by moving the bar of the slide bar 32 with the mouse, the ratio of the unit power supply for batch tasks decreases. In other words, user can transfer the entire share of the unit power supply for batch tasks to the task running in active window 31 via the slide bar 32. In the present example, the share of the unit power supply allocated to the batch tasks that can be used to increase the share of the unit power supply of task running in active window is 12.5× 0.05=0.625 W, which is caused by user sliding the slide bar 32. When this occurs, all batch tasks return back to waiting queue and enter into waiting state. Until there is idle share of the unit power supply, the batch tasks are arranged into the ready queue and executed by the processor sequentially.

Step 108: Observe the utilization over the shares of the unit power supply allocated to each task during when a periodic correction procedure interval is reached. The power management device holds a power management policy, which comprises a step of promulgating how often to run a correction procedure according to a periodic correction procedure interval, an example of the periodic correction procedure interval being 5 minutes. When the correction procedure is executed, the power management device observes the utilization of the shares of the power supply unit by the tasks. In a power supply period, the power management device distributes shares of a unit power supply to each task. However, if a task is accomplished before its share of the unit power supply is exhausted, the power management device will transfer the remaining (idle) power from the accomplished task to another task.

Step 109: According to the result in step 108, the shares of the power supply unit allocated to the tasks are redistributed. As stated before, during the correction procedure, the power management device observes the utilization of the shares of the unit power supply allocated to the tasks. If there is any remaining (idle) power left over in a share of the unit power supply allocated to a task, the power management device will make a correction by transferring the remaining (idle) power to an alive task, which means the reallocation of the shares of the power supply unit among the tasks.

Step 110: End.

According to the method of power management in the present invention, the key point of the method of power management comprises categorizing each task to be executed on the portable device according to the category of task and required power supply, distributing a predetermined ratio of the unit power supply to each task and allowing each task utilizes the share of the unit power supply allocated thereto to accomplish the job in the desired usage time of the portable device. In the present invention, the power management device provides a graphical user interface to allow for manual adjustment of the share of the unit power supply allocated to a task running in the active window, which can improve the performance of the task running in the active window. Furthermore, when the periodic correction procedure interval (e.g. five minutes) is reached, the power management device executes a correction procedure to observe the utilization of the shares of the unit power supply and adjust the shares of the unit power supply for each task dynamically. In this way, the optimization of the distribution of resources while taking a user's desires into account can be accomplished when using the portable device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing the power distribution for a portable device, which comprises:
   (a) categorizing each task to be executed on the portable device;
   (b) prescribing a power management policy;
   (c) based on the power management policy, allocating a predetermined ratio of a unit power supply to each task according to a category of which each task is associated therewith; and
   (d) increasing a ratio of the unit power supply allocated to a task running in an active window according to commands entered through a graphical user interface.

2. The method of managing the power distribution for a portable device of claim 1, wherein the unit power supply is obtained by dividing a total power supply amount provided by the portable device by a total number of power supply cycles within a desired usage time of the portable device.

3. The method of managing the power distribution for a portable device of claim 2, wherein the step of prescribing the power management policy comprises: designating the total number of power supply cycles within the desired usage time of the portable device and a periodic correction procedure interval;
   calculating the total power supply amount of the portable device; and
   calculating the unit power supply.

4. The method of managing the power distribution for a portable device of claim 3 further comprising:
   (e) observing a utilization of the unit power supply allocated to each task when the periodic correction procedure is reached; and
   (f) redistributing the unit power supply allocated to each task based on an observation.

5. The method of managing the power distribution for a portable device of claim 1, wherein in the step of increasing the ratio of the unit power supply allocated to the task running in the active window, a maximum increase to the ratio of the unit power supply allocated to the task running in the active windows equals an entire share the of the unit power supply allocated to tasks having a batch attribute.

6. The method of managing the power distribution for a portable device o of claim 1 further comprising detecting input/output devices being interacted with each task, and changes the category of which each task is associated therewith according to the type of the input/output devices.

7. The method of managing the power distribution for a portable device of claim 6 wherein:
   if the input/output device interacting with a task is a sound card, categorizing the task into a soft real-time task.

8. The method of managing the power distribution for a portable device of claim 6 wherein:
   if the input/output device interacting with a task is a mouse, categorizing the task into an interactive task.

9. The method of managing the power distribution for a portable device of claim 1, wherein the graphical user interface is implemented as a slide bar.

10. The method of managing the power distribution for a portable device of claim 1, wherein the graphical user interface is shown in the active window.

11. A method of managing the power distribution for a portable device, the method comprising:
   (a) categorizing each task to be executed on the portable device;
   (b) prescribing a power management policy;
   (c) based on the power management policy, distributing a predetermined ratio of a unit power supply among the tasks according to the a category of which each task is associated therewith; and
   (d) in response to commands inputted through a graphical user interface, transferring a ratio of a unit power supply allocated to tasks having a batch attribute to a task running in an active window.

12. The method of managing the power distribution for a portable device of claim 11, wherein the unit power supply is obtained by dividing a total power supply amount provided by the portable device by a total number of power supply cycles within a desired usage time of the portable device.

13. The method of managing the power distribution for a portable device of claim 12, wherein the power management policy comprises the steps:
   designating the total number of power supply cycles within the desired usage time of the portable device and a periodic correction procedure interval;
   calculating the total power supply amount of the portable device; and
   calculating the unit power supply.

14. The method of managing the power distribution for a portable device of claim 12 further comprising:
   (e) observing a utilization of the unit power supply allocated to each task when the periodic correction procedure is reached; and
   (f) redistributing the unit power supply allocated to each task based on an observation.

15. The method of managing the power distribution for a portable device of claim 11 further comprising detecting input/output devices being interacted with each task, and changing the category of which each task is associated therewith according to the type of the input/output devices.

16. The method of managing the power distribution for a portable device of claim 11 wherein:
   if the input/output device interacting with a task is a sound card, categorizing the task into a soft real-time task.

17. The method of managing the power distribution for a portable device of claim 11 wherein:
   if the input/output device interacting with a task is a mouse, categorizing the task into an interactive task.

18. The method of managing the power distribution for a portable device of claim 11, wherein the graphical user interface is implemented as a slide bar.

19. A portable device comprising:
   a processor for executing multiple tasks in an operating system;
   a power management device for categorizing each task to be executed on the portable device, prescribing a power management policy, distributing a predetermined ratio of a unit power supply among the tasks based on the power management policy according to a category of which each task is associated therewith, increasing a ratio of the unit power supply allocated to a task running in an active window in response to commands input by a user.

20. The portable device of claim 19, wherein the power management device provides a graphical user interface for the user to increase the ratio of the unit power supply allocated to the task running in the active window through the commands input by the user.

22. The portable device of claim 21, wherein the graphical user interface is implemented as a slide bar.

21. The portable device of claim 20, wherein the graphical user interface is shown in the active window.

* * * * *

UNITED STATES PATENT AND TRADEMARK OFFICE
CERTIFICATE OF CORRECTION

| | | |
|---|---|---|
| PATENT NO. | : 7,260,728 B2 | Page 1 of 1 |
| APPLICATION NO. | : 10/711356 | |
| DATED | : August 21, 2007 | |
| INVENTOR(S) | : Ruei-Chuan Chang et al. | |

It is certified that error appears in the above-identified patent and that said Letters Patent is hereby corrected as shown below:

On the Title Page, Item (30), Foreign Application Priority Data, the Foreign Application Priority Data should be supplemented to --Dec. 05, 2003  (TW).............................. 092134477 --

Signed and Sealed this

Thirteenth Day of November, 2007

JON W. DUDAS
*Director of the United States Patent and Trademark Office*